United States Patent [19]

Hans et al.

[11] Patent Number: 4,549,442
[45] Date of Patent: Oct. 29, 1985

[54] EXPANDING WEDGE ACTUATION DEVICE

[75] Inventors: Rüdiger Hans, Niederwerrn; Manfred Brandenstein, Eussenheim, both of Fed. Rep. of Germany

[73] Assignee: SKF Kugellagerfabriken GmbH, Schweinfurt, Fed. Rep. of Germany

[21] Appl. No.: 522,742

[22] Filed: Aug. 12, 1983

[30] Foreign Application Priority Data

Aug. 14, 1982 [DE] Fed. Rep. of Germany ....... 3230316

[51] Int. Cl.$^4$ ............................................. F16D 51/00
[52] U.S. Cl. .................................... 74/110; 188/343; 308/6 R
[58] Field of Search .................... 74/110; 188/343; 254/104; 308/6 R; 384/565

[56] References Cited

U.S. PATENT DOCUMENTS

| | | | |
|---|---|---|---|
| 3,001,838 | 9/1961 | Lamson et al. | 384/565 X |
| 3,511,103 | 5/1970 | Cox, Jr. | 74/110 |
| 3,599,763 | 8/1971 | Bailey | 188/343 X |
| 3,713,712 | 1/1973 | Derner et al. | 384/565 |

FOREIGN PATENT DOCUMENTS 2356075  8/1980  Fed. Rep. of Germany.

*Primary Examiner*—Martin P. Schwadron
*Assistant Examiner*—Stephen M. Hepperle
*Attorney, Agent, or Firm*—Eugene E. Renz, Jr.

[57] ABSTRACT

A wedge mechanism particularly adapted for expanding brakes of motor vehicles including a housing, a wedge member, a pair of push rods displaceably supported in the housing action upon the brake shoes of the brake by opposing displacement in a common perpendicular direction, rollers arranged between one of the two wedge surfaces of the wedge member and a complementary inclined surface of the push rod located opposite it, a cage for the rollers, which in relation to the spreading wedge is movable in longitudinal direction and which in turn has two parallel side portions running in perpendicular direction, with machined openings in them in the direction of the axis of rotation of the rollers for guiding the ends of the rollers facing the side portions, characterized in that both rollers (9) have a face (20,27) at their ends, gradually changing over into their roller surface (21) confronting the inclined wedge surfaces and that the opening in the roller cage (13) is formed by a common recess (16,26) for said rollers (9) formed on the inside of each side portion (15) of the roller cage (13) for the complementary inclined surface (8) of the push rods (5), the edge surfaces (17) of which, facing each other in longitudinal direction (3) closely embrace the ends of the rollers (9) longitudinally and the bottom surfaces (19) of which are arranged to support the opposing face (20, 27) of the rollers (9), respectively.

8 Claims, 6 Drawing Figures

EXPANDING WEDGE ACTUATION DEVICE

BACKGROUND OF THE INVENTION

I. Field of the Invention

The present invention relates to a wedge-type expansion assembly particularly adapted for expanding brake shoes of brake assemblies in motor vehicles.

II. Description of the Prior Arts

German Pat. No. 23 56 075 shows a prior wedge expansion device of the general type to which the present invention relates. In accordance with this prior known arrangement, the two ends of the rollers are provided with a guide pilot projecting axially over the face of the roller, each pilot portion engaging in an opening passing axially through the appropriate side portion of the roller cage. This prior known device has several disadvantages and drawbacks. For example, since the guide end of the rollers only have a small radial guide surface in the opening of the roller cage, there is the possibility of damage in operation under heavy load as a result of frictional wear. Rollers having guide pilot portions are also difficult to manufacture since the guide pilot portions must be machined concentric with the surface of the roller. It has been found that in hardening these rollers, residual stresses and quenching cracks may be formed at the transition of the face of the roller and the guide pilot portion.

SUMMARY OF THE INVENTION

With the foregoing in mind, it is an object of the present invention to provide an improved wedge assembly particularly adapted for expanding brakes of motor vehicles. To this end, the assembly or mechanism comprises a housing, two oppositely facing push rods supported for movement in the housing and cooperatively associated with the brake shoes. A roller is arranged between one of the two wedge surfaces of a spreading wedge and a complementary inclined surface of the push rod. The rollers having axial end faces gradually merging into the roller surface. The assembly further includes a cage having an opening defining a common recess for the rollers formed by machining, for example, on the inside of each side piece of the roller cage. The edges in the cage facing each other in longitudinal direction closely embrace the ends of the rollers longitudinally and the bottom surface of the cage is arranged to support the rolling surfaces of the rollers. By this construction, each roller at the transition of its end face and the roller surface runs against the edge of the recess machined at the inside of the side piece of the roller cage and is thereby guided. In other words, the rollers are held in place in a longitudinal direction over a relatively large area and guided at the edge of the recess in the cross direction, that is in the direction of the complementary inclined surfaces of the push rod. By this arrangement, the rollers can be economically mass produced and harmful angular deviation of the rollers in the cage is avoided since both ends of the rollers are supported on the flat bottom surface and at the edge of the recess.

In accordance with other structural features of the assembly, the rollers, cage and spreading wedge form a self-contained unit since both rollers are embraced radially from the outside by the edge surfaces facing each other which are disposed to come together inwardly from the opposite sides at the ends of each recess facing the complementary inclined surfaces of the push rod and therefore, the rollers are prevented from falling out of the roller cage.

In accordance with another feature of the present invention, the axial end faces of the roller are provided with a channel providing for a limited amount of elastic deflection of the roller contact surface adjacent the ends of the rollers. By this arrangement, overloading the longitudinally directed edges of the two wedge surfaces of the spreading wedge are avoided during operation. Even though the roller surface of the rollers overlaps these longitudinally edges to engage in the recess of the appropriate side piece of the roller cage, low edge loading is experienced since the overlapping ends of the rollers are elastically flexible.

Dangerous edge loading between the rollers and spreading wedge is also eliminated by a further feature of the invention comprising a groove running longitudinally and extending into the vicinity of the wedge surfaces.

In accordance with another feature of the present invention, an elastically compressible material such as a plastic having a low coefficient of friction is provided in each centric channel of the roller and/or in the grooves of the spreading wedge. This improves the anti-frictional properties of the rollers in contact between the recess of the roller cage and the face of the roller end engaging into the recess since the elastically compressible material dampens and absorbs end shocks of the roller against the supporting friction surface of the roller cage. The elastically compressible plastic material is preferably installed with an elastic pretension between the side portions of the roller cage and the roller or the spreading wedge thereby supporting the rollers and spreading wedge in place in the roller cage without play. In this manner, any shock loading during operation, the corresponding forces in the contact between the rollers and the roller cage or between the spreading wedge and the roller cage are maintained at a low level since there are no elements subject to play in the roller cage.

DESCRIPTION OF THE DRAWINGS

These and other objects of present invention and the various features and details of the operation and construction of an expanding wedge actuation device in accordance with the present invention are hereinafter more fully set forth with reference to the accompanying drawings wherein.

DESCRIPTION OF THE PREFERRED EMBODIMENTS

Figure 1:
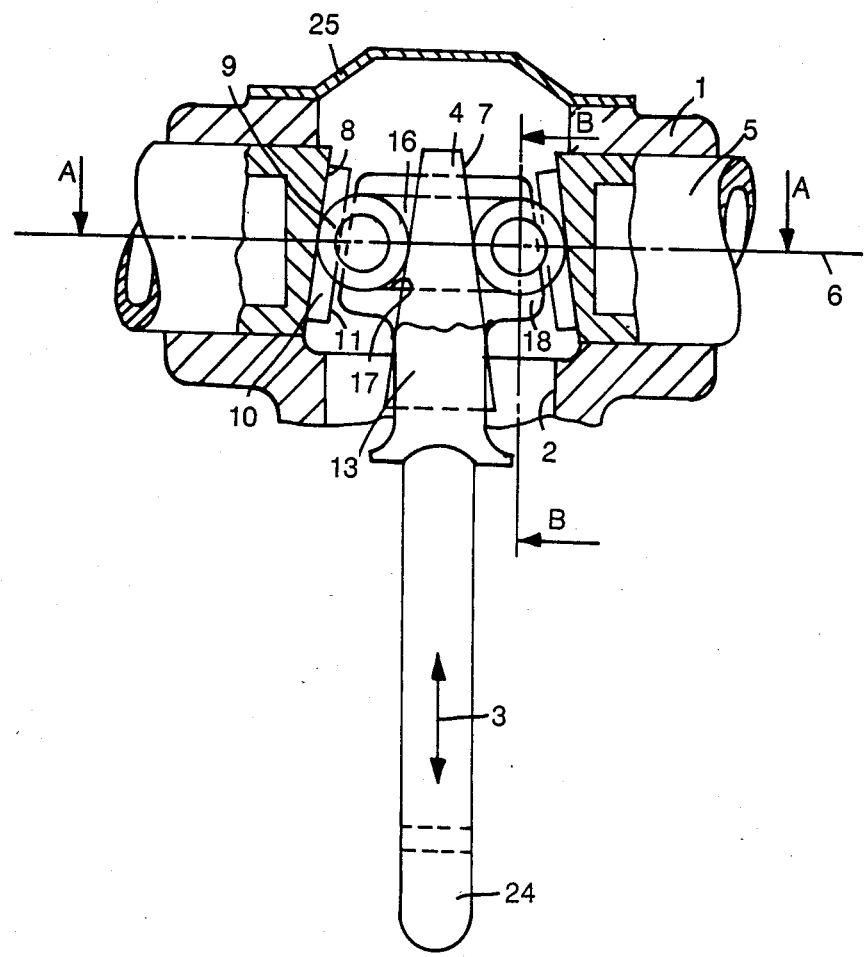
FIG. 1 is a transverse longitudinal sectional view through an expansion wedge assembly for brake shoes in accordance with the present invention.
Figure 2:
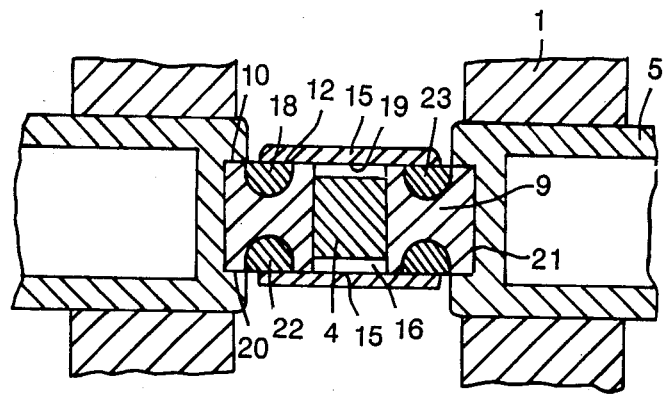
FIG. 2 is an enlarged sectional view taken along lines A—A of FIG. 1.

Referring now to the drawings, and particularly to FIGS. 1 and 2 thereof, there is illustrated an expansion wedge assembly in accordance with the present invention adapted for actuating push rods operatively associated with the brake shoes of expanding brakes for motor vehicles. The structural details and arrangement of the brake assembly are generally conventional. The expansion assembly includes a housing 1 and a pair of cylindrical push rods 5 which are operatively connected to the shoes (not shown) of the brake assembly and are slideably movable in aligned bores 5a in the housing in a common direction indicated by the numeral 6. The bottom of the housing is provided with a housing bore 2 to accommodate a spreading wedge 4 which is actuatable in a longitudinal direction 3 generally perpendicular or transverse to the direction or movement of the push rods.

As illustrated, the spreading wedge 4 has a pair of inclined wedge surfaces 7 which are generally parallel to confronting inclined surfaces 8 of the push rods 5. A pair of rollers 9 engages between the confronting parallel inclined surfaces of the wedge member and push rods respectively. The rollers 9 as illustrated in FIG. 2 are guided laterally between side surfaces 10 in the face of the push rod which project axially from the inclined surfaces thereof. Note that the inclined surface 8 of each push rod is formed by the bottom of a groove 12 which is machined into the flat front surface 11 of the push rod and faces inwardly. The two sidewalls of the longitudinal groove confronting each other form the opposing side surfaces 10 which guide the rollers.

The assembly further includes a roller cage which guide the rollers in the longitudinal direction 3, the cage being slideably movable on the spreading wedge 4 and between the side surfaces 10 of the push rods 5. The roller cage as illustrated is formed with two parallel side plate portions 15 which extend in the direction 6. The side portions 15 are formed with recesses 16 on the inner face thereof which is open toward the complementary inclined surface 8 of the push rods for guiding the ends of the rollers 9.

In the present instance, the two edge surfaces 17 of the recess 16 which face each other in a longitudinal direction 3 are generally parallel to each other in the cross direction 6.

Only the ends 18 of these edge surfaces facing the push rod are oriented to merge closer together inwardly from opposite sides so that the rollers when displaced to their outer most position away from one another are closely held or supported by the ends 18 and are therefore prevented from falling out of the roller cage when, for example, the push rods are disassembled. Note that the flat bottom surface 19 of the recess 16 supports the opposing flat axial end faces 20 of the rollers 9.

In accordance with another feature of the present invention, a centric depression 22 is formed, for example, by machining in the outer axial end faces of the rollers 9 in the vicinity of the roller surface 21 to provide for an elastic deflection of the roller surface 21 adjacent the ends of the rollers. In the present instance an elastically compressible material, such as an open cell foam plastic 23 filled with a lubricant is mounted in each depression 22, for example, by means of an adhesive. The plastic has excellent non-friction properties and is preferably installed with elastic pretension between the side portions 15 of the roller cage and the roller 9.

Figure 3:
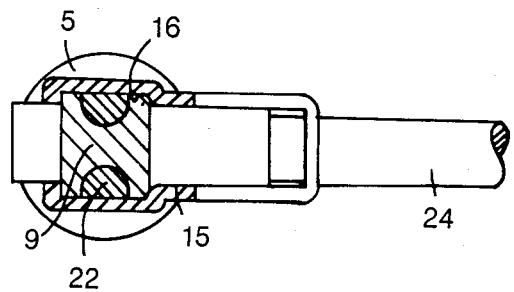
FIG. 3 is an enlarged sectional view taken on lines B—B of FIG. 1.

The roller cage 13 is preferably made of a sheet metal and each recess 16 is formed by a pressing process without involving cutting. The roller cage 13 as illustrated envelopes the upper end of the spreading wedge 4 and is of a generally U-shaped configuration as illustrated in FIGS. 1 and 3. The spreading wedge 4 as illustrated in FIG. 1 is provided with a rod-like operating extension 24 which passes through an opening 13a in the bottom of the roller cage 13. A housing cover 25 fastened to the housing by means of screws or the like forms an upper end closure for the housing bore 2.

Figure 4:
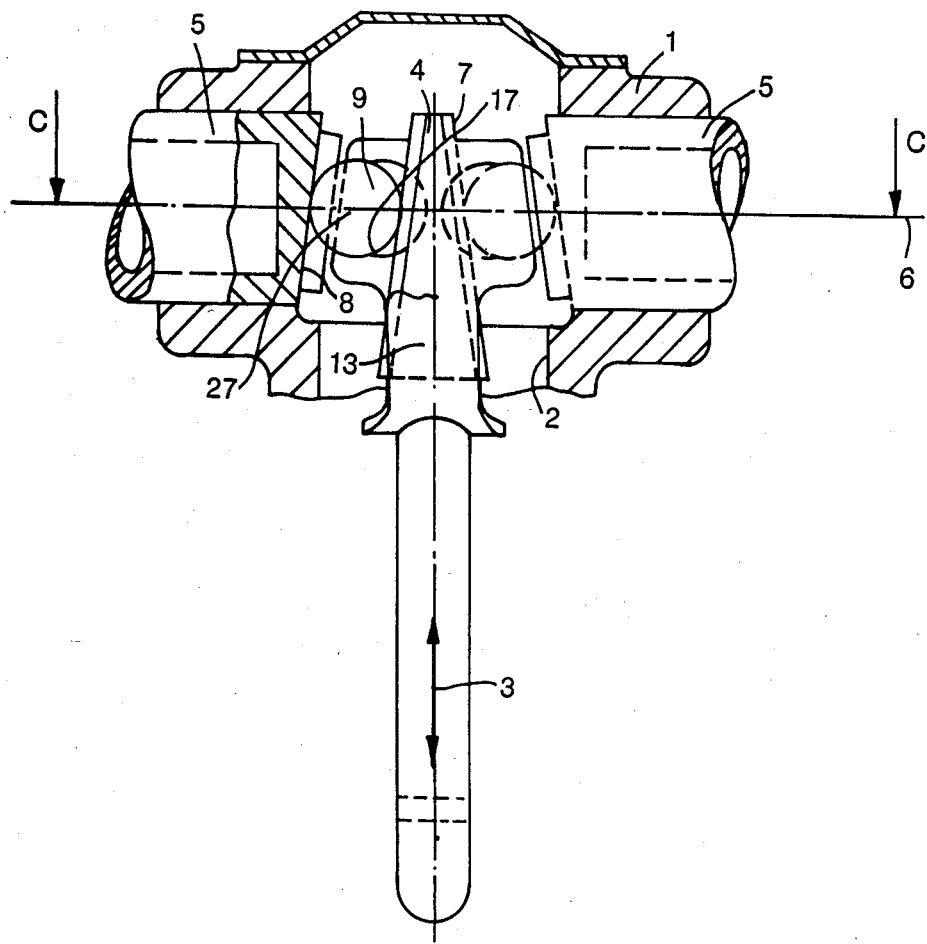
FIG. 4 is a view similar to FIG. 1 showing a modified form of expanding wedge actuation device in accordance with the present invention.
Figure 5:
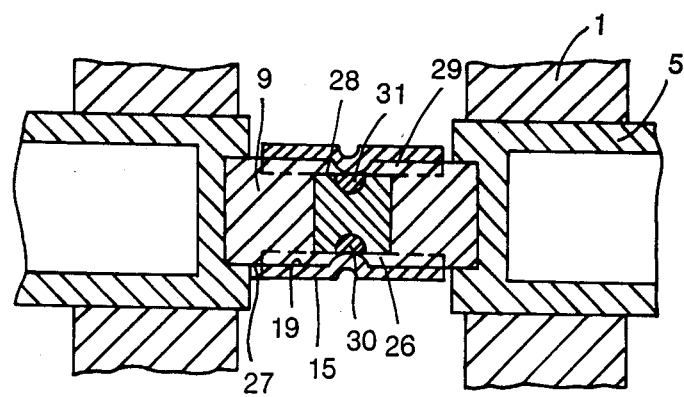
FIG. 5 is an enlarged sectional view taken on lines C—C of FIG. 4.

There is illustrated in FIGS. 4 and 5 a modified expansion wedge assembly in accordance with the present invention which in overall construction and arrangement is generally similar to that described above. Thus, the assembly includes a spreading wedge 4 which projects into the housing bore 2 and is actuatable in a longitudinal direction 3 to effect movement of a pair of push rods 5 slidably supported in the housing which by opposite shifting in a common cross direction 6 act upon the brake shoes (not shown) of an expanding brake of a motor vehicle. As in the previously described embodiment, a pair of rollers are disposed between the confronting inclined wedge surfaces 7 of the spreading wedge 4 and complementary inclined surfaces 8 formed in the confronting axial ends of the push rods 5. The rollers 9 as illustrated are supported in a common roller cage 13 which is arranged movably in a longitudinal direction 3 on the spreading wedge 4.

In accordance with this embodiment of the invention, the opening for guiding the ends of the rollers 9 facing the end portion 15 of the cage is formed by a machined recess 26 on the inside of each side portion 15 of the roller cage 13. As illustrated, each recess 26 is open towards the complementary inclined surface 8 of the push rod 5. The recess has two edge surfaces 17 which face each other in longitudinal direction and which closely embrace the ends of the rollers 9 longitudinally. The smooth flat face 27 of each roller is supported on the flat bottom surface 19 of the recess 26.

In the present instance, the spreading wedge has a pair of flat longitudinal surfaces 28 which are disposed parallel to one another thereby limiting the two wedge surfaces 7 laterally. A longitudinally extending channel 32 in the vicinity of the wedge surfaces 7 is formed in each longitudinal surface 28 to facilitate elastic deflection of the side edges 29. An elastically compressible plastic material 31 having a low coefficient of friction is mounted in each of the channels 30 to provide for an elastic deflection of the side edges 29 of the wedge surfaces 7. The plastic insert 31 is preferably mounted with elastic pretension between the side portions 15 of the roller cage and the longitudinal surface of the spreading wedge 4. The plastic insert 31 may be fastened in the channel by a suitable adhesive.

Figure 6:
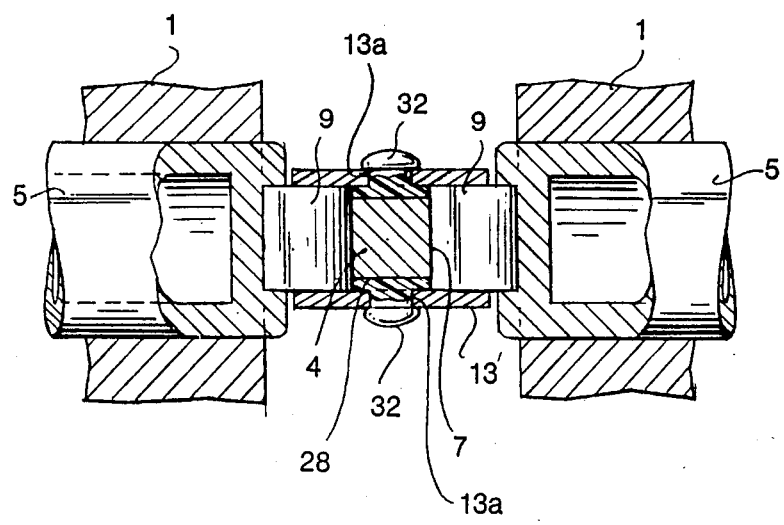
FIG. 6 is a sectional plan view similar to FIG. 5 showing an additional modification.

Even though particular exemplified embodiments of the present invention have been illustrated and described herein, it is not intended to limit the invention and changes and modifications may be made therein within the scope of the following claims. For example, the plastic inserts having the non-frictional properties of the spreading wedge shown in accordance with the embodiment illustrated in FIGS. 4 and 5, does not necessarily have to be attached in the channel of the spreading wedge. Instead, as illustrated in FIG. 6, it can be formed as a thin disc made of a synthetic material having a low coefficient of friction fastened to the appropriate side portion of the roller cage. The disc then is also operative as a vibration damping cushion between the spreading wedge and the roller cage. The disc 32 may be fastened by push button like projections 32 formed in the disc which snap elastically into corresponding openings 13a in the side portions of the roller cage from the interior thereof. Both limiting edges of the disc facing in a cross direction can elastically press against the roller and be adjusted free of vibration and side play.

SUMMARY OF THE INVENTION

A spreading wedge operating mechanism consists of a housing (1) with a spreading wedge (4) which is operable in longitudinal direction and in the housing two displaceably supported push rods (5) as well as a roller (9) arranged tightly between an inclined surface (8) of a push rod (5) and one wedge surface (7) of the spreading wedge (4). Both rollers (9) are installed in a common roller cage (13) which in relation to the spreading wedge (4) is movable in the longitudinal direction (3).

In order for the spreading wedge operating mechanism to have a relatively long useful life in operation even under high load, both rollers (9) at their ends have a face, changing over gradually into their roller surface. For each individual roller or for both rollers (9) a recess (16) has been machined on the inside of each side piece (15) of the roller cage (13) in the direction of the axis of rotation of the rollers (9). Each recess (16) is open towards the complementary inclined surface (8) of one or both push rods (5) and has two edge surfaces (17) facing each other in longitudinal direction (3) which are arranged to closely embrace the end of one or both rollers (9) longitudinally and the bottom surfaces (19) of which are arranged to support the opposing face of the one or of both rollers (9), respectively (FIG. 1).

We claim:

1. A wedge mechanism particularly adapted for expanding brakes of motor vehicles including a housing, a wedge member, a pair of push rods displaceably supported in the housing acting upon the brake shoes of the brake by opposing displacement in a common perpendicular direction, rollers arranged between one of the two wedge surfaces of the wedge member and a complementary inclined surface of the push rod located opposite it, a cage for the rollers, which in relation to the spreading wedge is movable in a longitudinal direction and which in turn has two parallel side portions running in a perpendicular direction, with machined openings in them in the direction of the axis of rotation of the rollers for guiding the ends of the rollers facing the side portions, characterized in that both rollers (9) have a face (20,27) at their ends, gradually changing over into their roller surface (21) confronting the inclined wedge surfaces and that the opening in the roller cage (13) is formed by a common recess (16,26) for said rollers (9) formed on the inside of each side portion (15) of the roller cage (13) for the complementary inclined surface (8) of the push rods (5), the edge surfaces (17) of which, facing each other in longitudinal direction (3) closely embrace the ends of the rollers (9) longitudinally and the bottom surfaces (19) of which are arranged to support the opposing face (20,27) of the rollers (9), respectively.

2. A wedge mechanism according to claim 1, characterized in that the two longitudinally opposed edge surfaces (17) of each recess (16) are arranged to come together inwardly from opposite sides at the ends (18) facing the complementary inclined surface (8) of the push rod (5).

3. A wedge mechanism according to claim 1 characterized in that both faces (20) of each roller (9) have a centric channel (22) extending into the vicinity of the roller surface (21) for the elastic deflection of the roller surface (21) of the ends of the rollers (9).

4. A wedge mechanism according to claim 1, characterized in that the spreading wedge (4) has two longitudinal surfaces (28) laterally limiting its two wedge surfaces (7), into each of which a groove (30) is machined running longitudinally, extending into the vicinity of the two wedge surfaces (7) for the elastic deflection of the side edges (29..

5. A wedge mechanism according to claim 3, characterized in that an elastically compressible material, e.g., plastic (23, 32) with antifriction properties is arranged in each centric channel (22) of the roller (9).

6. A wedge mechanism according to claim 5, characterized in that the material (23) is installed with elastic pretension between the appropriate side piece (15) of the roller cage (13) and the roller (9) or the spreading wedge (4), respectively.

7. A wedge mechanism according to claim 1, characterized in that the roller cage (13) is made from strip material, e.g., sheet metal and each recess (16) of the roller cage (13) is formed in the non-cutting pressing process.

8. A wedge mechanism according to claim 4, characterized in that an elastically compressible material, e.g., plastic (23, 32) with antifriction properties, is arranged in the two grooves (30) of the spreading wedge (4).

* * * * *